United States Patent [19]

Schnitzler

[11] 4,138,328

[45] Feb. 6, 1979

[54] USE OF A HIGH CAPACITY AERATION COMPARTMENT IN A MULTIPLE AERATION SYSTEM

[76] Inventor: Erwin Schnitzler, Kopernikusstrasse 26, Karlsruhe 21, Fed. Rep. of Germany, 7500

[21] Appl. No.: 803,313

[22] Filed: Jun. 3, 1977

[30] Foreign Application Priority Data

Jun. 5, 1976 [DE] Fed. Rep. of Germany ....... 2625415

[51] Int. Cl.$^2$ .......................... C02C 1/08; C02C 5/10; B01D 21/10
[52] U.S. Cl. ......................................... 210/7; 210/15; 210/195 S; 210/199; 210/220; 210/528
[58] Field of Search ................... 210/4, 5, 6, 7, 195 S, 210/197, 199, 205, 208, 220, 15, 14, 528

[56] References Cited

U.S. PATENT DOCUMENTS

| | | | |
|---|---|---|---|
| 3,053,390 | 9/1962 | Wood | 210/208 |
| 3,412,017 | 11/1968 | Abson | 210/195 S |
| 3,415,379 | 12/1968 | Thayer | 210/220 |
| 3,703,462 | 11/1972 | Smith | 210/7 |
| 3,735,870 | 5/1973 | Uden | 210/195 S |
| 3,764,524 | 10/1973 | Stankewick | 210/7 |
| 3,776,841 | 12/1973 | Torpey | 210/197 |
| 3,897,334 | 7/1975 | Murphy | 210/199 |
| 3,920,550 | 11/1975 | Farrell | 210/199 |
| 3,977,965 | 8/1976 | Tholander et al. | 210/4 |
| 4,002,561 | 1/1977 | Traverse | 210/220 |

OTHER PUBLICATIONS

Wasser, Luft, und Betrieb, vol. 20, 196, pp. 298-300, 1976.

Chemical and Process Technology, Encyclopedia, Consicline, Editor, McGraw-Hill Book Co., N. Y. 1974.

Primary Examiner—Charles N. Hart
Assistant Examiner—Ernest G. Therkorn
Attorney, Agent, or Firm—Karl F. Ross

[57] ABSTRACT

An apparatus for the purification of waste water in accordance with the activated-sludge process which comprises a buffer vessel downstream of a settling tank with a mechanical cleaner, at least one oxidation trough or vessel provided with at least one aerating device and a device for subdividing the input into the latter receptacle in the region of the aeration device, an afterclarifying receptacle and a sludge recycling path from the afterclarifier. The buffer vessel is provided in addition with an aeration device and the waste water or sewage is treated therein to partially reduce its biological oxygen demand. Between the buffer vessel and the oxidation receptacle, a high-efficiency stage is provided which is formed with an aeration device. The sludge recycle from the afterclarifier is introduced into the high-efficiency receptacle which is provided in the region of the aeration device of the latter with a distributor for the recycled sludge and a distributor for the discharge from the buffer vessel.

7 Claims, 1 Drawing Figure

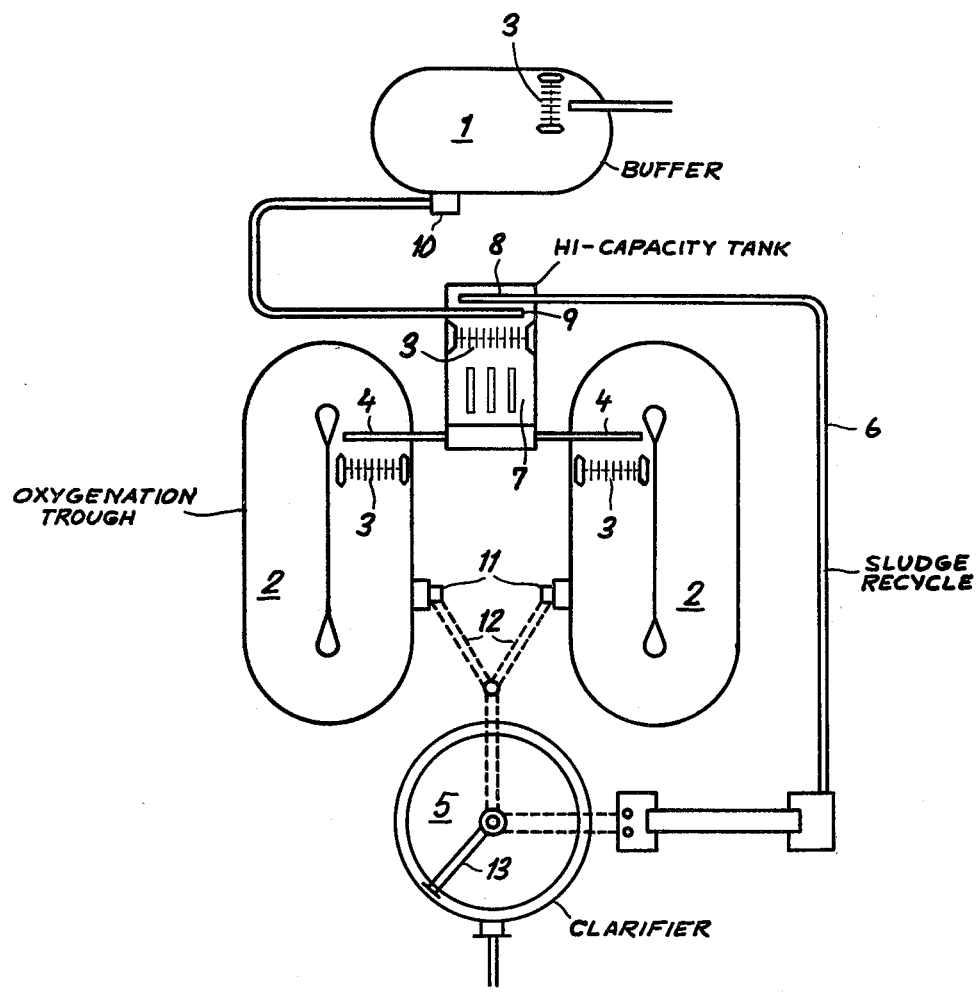

USE OF A HIGH CAPACITY AERATION COMPARTMENT IN A MULTIPLE AERATION SYSTEM

FIELD OF THE INVENTION

The present invention relates to an apparatus for the purification of waste water and, more particularly, to a waste-water or sewage-treatment plant and to a method of operating a waste-water or sewage-treatment plant.

Background of the Invention

It has been proposed heretofore to effect purification of waste water or sewage, so that the effluent can be discharged into streams or the like without contaminating same, by providing a plant for the treatment of sewage and waste water in accordance with the activated sludge process. One such plant or sewage-treatment system, comprises a buffer vessel which is provided downstream from a settling tank which has a mechanical cleaning device for removing particulates from the waste water, at least one oxidation trough or tank having an aerating device and a distributing device for finely dividing the influent in the trgion of the aerating device, an afterclarifier and a sludge-recycling system. A conventional plant of this type can also be provided with an aeration unit in the buffer vessel for partial reduction of the biological oxygen demand ($BOD_5$), hereinafter referred to also by the German-language designation BSB5-value. An oxidation trough is, in the framework of the present invention, an aerating tank with a mechanical aerating device and, generally, an agitator or the like for displacing the mass within this tank.

A plant of the aforedescribed type is described, for example, in *Wasser, Luft und Betrieb*, vol. 20, 1976, pp. 298ff, to which reference may be had for the details of an appropriate buffer vessel, oxidation trough or tank and other elements or units which may be used in accordance with the present invention.

In this conventional system, the suspension flows from the buffer vessel directly into the oxidation trough or tank.

Special process parameters which detail the operations in the buffer vessel, the oxidation trough or tank and in the afterclarifying vessel are not given in this publication.

Efforts to make use of the teachings of this publication have invariably resulted in a production of excess sludge which must be concentrated and separately treated from the effluent. Tests carried out extensively with this apparatus have demonstrated that the production of excess sludge is unavoidable.

In practice, the after treatment of the sludge poses a problem because it cannot be consumed in the plant and, for separate treatment, high capital and energy expenditures are required. For example, it cannot be consumed in the wet state and must be dried at high energy cost.

OBJECTS OF THE INVENTION

It is the principal object of the present invention to improve upon the apparatus described previously and in the aforementioned publication so that the generation of excess sludge is avoided.

Another object of the invention is to provide a waste-water or sewage-treatment plant which is more efficient than the existing systems, avoids the formation of excess sludge which requires separate handling and can operate with reduced energy expenditure.

Yet another object of this invention is to provide a method of operating a waste-water or sewage-treatment plant so that excess sludge is not produce.

It has been found, most surprisingly, that these objects can be attained in a plant of the type described previously but which is provided between the buffer vessel and the oxidation trough or tank with a high-efficiency stage or receptacle which is provided with at least one aerating device and to which the recycled sludge is fed from the afterclarifying tank. According to a feature of the invention, which is essential to the elimination of the formation of excess sludge, the high-efficiency tank is provided, in the region of the aerating device or the aerating devices, with a distributor for finely dividing the recycled sludge. Another vital component, for the purposes of the present invention is a distributor for finely dividng the influent to the high-efficiency stage, i.e. the effluent from the buffer vessel.

The distributors which are used in accordance with the present invention are so-called fine distributors which can subdivide a fluid stream into fine droplets or particles. Any conventional fine distributor performing this task can be used.

For example, the fine distributor can extend over the width of the tank (transverse to the flow direction) in the form of distributing tubes, pipes or troughs which are adapted to breakup the recycled sludge and the influent from the buffer vessel, respectively, into relatively small streams, sprays or droplets.

According to a feature of the invention, the fine distributor for the recycled sludge can be structurally united with the fine distributor for the effluent from the buffer tank, i.e. the two fine distributors can constitute a single structural unit in the high-efficiency tank.

It has been found to be advantageous, moreover, to constitute the aeration device as a rotor which can be provided with at least one rotatable drum. In this case, the fine distributor for both the recycled sludge and the effluent from the buffer vessel can be disposed upstream of the drum rotor and parallel to the axis thereof.

The high-efficiency tank can be formed as a special receptacle, i.e. independently of the other receptacles of the system as described above. However, it is also possible within the framework of the invention to provide the high-efficiency tank as a cell or compartment in the oxidation trough or tank with the suspension being circulated therethrough. If two oxidation troughs or tanks are provided, these are connected in parallel.

The advantages attained by this system will be immediately apparent. For example, it allows the plant to be operated such that excess sludge is no longer produced. Hence, the problems encountered with the handling and treatment of excess sludge are eliminated. For example, in the high-efficiency compartment or cell of the oxidation trough or tank, the sludge is decomposed so that, within the system as a whole, a sludge balance is maintained whereby the sludge consumption in the high-efficiency compartment or cell is in equilibrium with the sludge generation and hence a steady state is established with respect to the sludge.

From the point of view of the mass transformation and enzyme kinetics of the system, it will be apparent that the system of the present invention results in a sludge equilibrium in that the sludge generated in the system is oxidized in a wet state also in the system in equilibrium with the sludge generation.

Another aspect of the invention is, of course, a method of operating a waste-water or sewage-treatment plant of the aforedescribed type. This method or process is characterized by the following critical steps or relationships:

(a) in the buffer vessel of the plant, a partial reduction of 10 to 15% of the biological oxygen demand (BSB5-value) is effected to a sludge volume of substantially 1 to 4 ml/l, a sludge oxygen content of about 0.03 to 0.05 gTS/l;

(b) in the high-efficiency vessel the effluent from the buffer vessel and the recycle from the afterclarifier are fed so that the mean residence time is substantially 1 to 3 hours, resulting in a reduction of the biological oxygen demand (BSB5-value) of 75 to 80% with a flowrate such that the sludge flakes or particles are held in suspension, the oxygen content being thereby maintained between substantially 2 and 4 mg/l; and (c) in the oxidation trough or tank, the feed from the high-efficiency tank is introduced such that the average residence time in the oxidation trough or tank is substantially 10 to 20 hours with the flowrate being such that the sludge flakes or particles are held in suspension and the oxygen content is maintained between 0.1 and 3 mg/l.

According to a feature of the invention, in the high-efficiency tank and in the oxidation trough, a flow equilibrium is established so that in the oxidation trough or tank, the sludge is sufficiently decomposed that, when the suspension is settled in the afterclarifier, only sufficient sludge is deposited per unit volume of sewage treated to correspond to the recycle requirements.

BRIEF DESCRIPTION OF THE DRAWING

The above and other objects, features and advantages of the present invention will become more readily apparent from the following description, reference being made to the accompanying drawing, the sole FIGURE of which illustrates a sewage-treatment plant in accordance with the present invention having two oxidation troughs.

SPECIFIC DESCRIPTION AND EXAMPLE

In the following description, where reference is made to a buffer vessel, an oxidation trough or tank, an afterclarifier or recycling system, or to a precleaning and settling tank, the details of these elements may be found in the aforementioned publication or elsewhere in the literature relevant thereto, e.g. pp. 1145ff of *CHEMICAL AND PROCESS TECHNOLOGY ENCYCLOPEDIA*, Douglas M. Considine, Editor, McGraw-Hill Book Co., N. Y., 1974.

The plant according to the invention for the treatment of sewage by the activated sludge process comprises a buffer vessel 1 which is provided downstream of a settling tank and a mechanical aftercleaner such as a grate, screen or filter, of the type described in the aforementioned publication. Downstream of the buffer vessel, there is provided a pair of parallel-connected oxidation troughs or tanks 2, each of which is formed with an aerating device represented generally at 3 in addition to a fine distributor 4 for spraying or otherwise subdividing the effluent from the preceding stage into a multiplicity of small streamlets which can pass between the vanes of the aerator. The aerator vanes can be perforated to distribute the oxygen into the finely divided effluent of the previous stage. The fine distributors 4 are disposed in the region of the respective aerating devices 3. The plant also comprises in accordance with conventional practices, an after-clarifying tank or receptacle 5 which receives the combined effluents from the oxidation troughs or tanks 2. A sludge recycling system 6 is provided for drawing the sludge settled in the after-clarifying tank 5 and returning it to a stage upstream in the process.

In addition, the buffer tank or vessel 1 is provided with an aerating device 3 of the type described which is disposed ahead of the inlet and results in a partial reduction of the biological oxygen demend (BSB 5- value) in the buffer vessel. According to an essential teaching of the present invention, between the buffer vessel and the oxidation troughs 2 there is provided a high-efficiency tank or cell 7 which is new in the combination described and has not, to applicant's knowledge, been provided in the described combination heretofore. The term "high-efficiency tank or cell" as used herein is intended to refer to a receptacle of substantially smaller volume than either the buffer tank or the oxidation troughs or tanks so that the throughput per unit volume of this high-efficiency tank is greater than elsewhere in the system.

The high-capacity tank 7 is provided with an aerating device 3 of the type previously described, proximal to the fine distributors 8 and 9.

The sludge recycle along the path 6 from the clarifier and settling tank 5 opens into the high-capacity tank 7 in the region of the aeration device via the fine distributor 8 for the sludge. The effluent from the buffer vessel 1 is discharged into the high-capacity tank 7 via the fine distributor 9 in the region of the aerating device 3. Both of the fine distributors can be distributing tubes provided with multiplicities of perforations and extending over the full width of the high-capacity tank 7 as illustrated, or distributing troughs.

In the embodiment illustrated and in accordance with a preferred embodiment of the invention, all of the vessels 1, 2 and 7 are provided with aerating devices 3 in the form of drum-type rotors whose vanes are mounted upon a common shaft and are rotatable simultaneously with the forcing of air therethrough. Naturally, other aerating devices known in the art can be used.

Instead of a separate tank for the high-capacity receptacle 7 as has been shown in the flow diagram of the drawing, the oxidation troughs or tanks 2 can be subdivided into cells, one of the cells of each oxidation tank being formed as a high-throughput tank 7 so that the suspension in the remainder of the oxidation trough or tank can be controlled independently of that in the high-throughput cell or compartment. The suspension can flow from the high-capacity cell or compartment directly into the remainder of the oxidation trough or tank 2.

The system described above operates in accordance with the following specific example:

Waste water, which has been freed from insouble and settleable components in a mechanical clarifier and screening arrangement, is brought to a pH of 7 to 8 by the additional of alkali or acid and is introduced into the buffer vessel 1.

The volume of the buffer vessel 1 should be about 5 times the hourly flow quantity of the influent. The buffer vessel 1 is provided with a mechanically controllable discharge weir and thus forms a storage tank which can accommodate fluctuations in volume of the feed and deliver a substantially constant volume per unit time of an effluent, which can correspond to the mean rate of flow of the influent, to the high-capacity tank 7.

The buffer tank 1 is provided with the mechanical aerating device 3 for circulating the contents of the buffer tank and introducing oxygen to bring about an enzymatic decomposition of organic components avoiding anaerobic processes. The tank 1 has previously been provided with an enzyme fixed on a substrate. The biological oxygen demand (BSB5-value) is reduced by amount 10 to 15% with the formation of 1 to 4 ml/l of sludge, sludge content of 0.03 to 0.05 gTS/l (total oxygen per liter).

From the buffer tank 1, the suspension is delivered to the high-throughput tank 7 to which the recycled sludge from the clarifier 5 is fed, the sludge and the effluent from the buffer vessel 1 being introduced through fine distributors 8 and 9. The volume of the high-capacity tank is determined by the requirement that the effluent from the buffer vessel and the sludge recycle should have a residence time of 1 to 3 hours in this high-efficiency tank 7. The aeration and mixing is effected by the mechanical aeration device 3 previously described, and additional oxygen-introducing distributors, to which oxygen is fed under pressure, or to which compressed air is fed, can be provided. The oxygen content in tank 7 is continuously maintained between 2 and 4 mg/l. Under these conditions, the main reduction of the biological oxygen demand (BSB5 load) takes place, namely, the biological oxygen demand is reduced by 65 to 75%. This results in the formation of biologically active sludge in a quantity correlated with the degree of reduction in the biological oxygen demand (BSB5 load) of the waste water. The suspension of biologically active sludge in the liquid is introduced into the oxidation troughs or tanks 2.

The oxidation troughs 2 are circulating tanks with mechanical aerating devices 3 so operated that because of the introduction of air and the mixing, the kinetic energy of the mixing is transferred to the material to be treated and subdivides the latter to maintain the solids in suspension. A circulating rate of 0.15 to 0.35 m/sec. (peripheral speed of the rotatable aerating device) is maintained.

This ensures that the flocculated sludge will be uniformly distributed throughout the liquid phase. The size of the oxidation trough is determined such that the mean residence time in the oxidation troughs is 10 to 20 hours for the circulating water.

The oxidation troughs thus operate as weakly loaded activated sludge reaction vessels with long-term aeration. The oxygen supply is controllable so that an oxygen concentration between 1 and 3 mg/l can be established. The discharge of the effluent from the oxidation troughs 2 to the clarifier tank 5 is effected by a motor-controlled overflow weir and siphon tube 12.

In the oxidation troughs and/or tanks 2, the suspension from the high-capacity tank 7, which has its starting biological oxygen demand BSB5) reduced by about 65 to 75%, is diluted in a ratio of 1:5 to 1:10.

Because of the transformation of the substrate to basic energy and biosludge material, the suspension circulated in the oxidation troughs or tanks 2 has only small quantities of the original substrate. To cover the energy requirements of the sludge mass in the oxidation troughs or tanks 2, sludge is decomposed. This sludge decomposition correlates with the substrate deficiency. The result is that the decomposition of the biomass forms a specific substrate for the energy supply and this is used later for the new production of the sludge material.

Consequently, a reduced quantity of sludge is recovered in the clarifier 5 and this sludge is maintained active. The oxygen supply for the oxidation troughs or tanks 2 can control this relationship. In contract with the parameters prevailing in the high-capacity tank 7, a very low space loading of 0.08 to 0.15 is maintained in the oxygen trough or tank 2 and the corresponding sludge loading is from 0.017 to 0.034. All of the parameters above apply when only one oxygen trough or tank is used.

The clarifier tank 5 is formed for example as a cylindrical tank having a sluge mixer 13 which rotates about the axis of the tank. The active sludge deposited in the clarifier 5 is continuously withdrawn and is recycled to the high-capacity tank 7 by a worm pump or the like.

In the process and apparatus described, there is no sludge excess so that all of the sludge withdrawn from the tank 5 is circulated. An equilibrium is thus established between the sludge production and the recycled sludge in accordance with the sludge index. Of course, solids which may be entrained by the liquid and which do not participate in the biochemical process, should be removed.

I claim:

1. In an apparatus for the treatment of waste water by an activated sludge process which comprises a buffer vessel, at least one oxidation trough provided with an aerating device and a fine distributor for subdividing the effluent from said buffer vessel into said oxidation trough, a clarifier connected to said oxidation trough for separating active sludge from an effluent therein, and means for recycling sludge from said clarifier, the improvement which comprises:

(a) an aerating means in said buffer vessel for partially reducing the biological oxygen demand in water to be purified in said buffer vessel;

(b) a high-capacity compartment between said buffer vessel and said oxidation trough receiving an effluent from said buffer vessel and delivering a suspension to said oxidation trough;

(c) an aerating device in said high-capacity compartment for aerating a suspension of sludge in water therein, said means for recycling sludge from said clarifier being connected to said high-capacity compartment;

(d) a first fine distributor juxtaposed with said aerator in said high-capacity compartment and delivering said effluent from said buffer vessel thereto; and (e) a second fine distributor connected to said recycling means and juxtaposed with said aerator in said high-capacity compartment for finely dividing the recycled sludge delivered thereto, the distributors in said high-capacity compartment extending over the full width thereof.

2. The apparatus defined in claim 1 wherein said aerating devices are rotor drums.

3. The apparatus defined in claim 1 wherein said compartment is formed in said oxidation trough.

4. The improvement defined in claim 1 wherein said compartment is an independent tank.

5. The apparatus defined in claim 1 wherein said buffer vessel is provided with an aerator and an inlet opening into said vessel directly upstream of said aerator.

6. The improvement defined in claim 5 wherein said clarifier is provided with a rotatable sludge-displacing member.

7. A method of operating a waste-water treatment plant which comprises:
- a buffer vessel receiving waste water to be treated;
- a high-capacity compartment connected to said buffer vessel and receiving an effluent therefrom;
- at least one oxidation trough communicating with said high-capacity compartment for long-term oxidation of organic components in a suspension received from said high-capacity compartment;
- a clarifier for separating a dischargable effluent from a sludge, and means for recycling said sludge;

said method comprising the steps of:
(a) introducing oxygen into said buffer vessel to effect a partial reduction of the biological oxygen demand by 10 to 15% in producing said effluent, said effluent having a sludge volume of 1 to 4 ml/l, sludge oxygen content of about 0.03 to 0.05 g/l total oxygen (b) recycling said sludge from said clarifier to said high-capacity compartment and maintaining the effluent received from said buffer vessel and the recycled sludge in said high-capacity compartment for an average residence time of 1 to 3 hours, and introducing oxygen into the effluent in said high-capacity compartment to reduce the biological oxygen demand thereof from 65 to 75%, sludge particles being maintained distributed in the liquid in said high-capacity compartment, the oxygen content thereof being held between 1 and 4 mg/l;

(c) maintaining the suspension delivered from said high-capacity compartment in said oxidation trough for a mean residence time of 10 to 20 hours and operating said oxidation trough at a volumetric flowrate of the suspension to maintain the sludge floatingly dispersed therein, the oxygen content being held between 0.1 and 3 mg/l; and (d) maintaining a sludge equilibrium between the recycled sludge and the sludge generated in said high-capacity compartment and said oxidation trough.

* * * * *